(12) United States Patent
Koibuchi et al.

(10) Patent No.: US 7,747,297 B2
(45) Date of Patent: Jun. 29, 2010

(54) PERSONAL DIGITAL ASSISTANT WITH SLIDE MECHANISM

(75) Inventors: Yousuke Koibuchi, Higashiyamato (JP); Takashi Aizawa, Hino (JP); Takayuki Nakajima, Naka-gun (JP)

(73) Assignee: Casio Hitachi Mobile Communication Co., Ltd., Tokyo (JP)

( * ) Notice: Subject to any disclaimer, the term of this patent is extended or adjusted under 35 U.S.C. 154(b) by 408 days.

(21) Appl. No.: 11/249,091

(22) Filed: Oct. 12, 2005

(65) Prior Publication Data

US 2006/0114646 A1 Jun. 1, 2006

(30) Foreign Application Priority Data

Oct. 13, 2004 (JP) ............................. 2004-299098

(51) Int. Cl.
*H04M 1/00* (2006.01)
(52) U.S. Cl. ................................. 455/575.4; 455/575.1
(58) Field of Classification Search .............. 455/575.4, 455/575.1
See application file for complete search history.

(56) References Cited

U.S. PATENT DOCUMENTS

| | | | | |
|---|---|---|---|---|
| 5,151,946 | A | * | 9/1992 | Martensson .............. 455/575.4 |
| 6,822,871 | B2 | | 11/2004 | Lee et al. |
| 2005/0009581 | A1 | * | 1/2005 | Im et al. .................. 455/575.4 |
| 2005/0113154 | A1 | * | 5/2005 | Park et al. ................ 455/575.4 |
| 2005/0221873 | A1 | * | 10/2005 | Kameyama et al. ...... 455/575.4 |

FOREIGN PATENT DOCUMENTS

| | | |
|---|---|---|
| CN | 1503541 A | 6/2004 |
| JP | 2002-055737 | 2/2002 |
| JP | 2003-110675 | 4/2003 |
| JP | 2003-125052 | 4/2003 |
| JP | 2004-032671 | 1/2004 |
| JP | 2004-253526 | 9/2004 |
| KR | 10-2004-0027542 | 4/2004 |

OTHER PUBLICATIONS

Kameyama et al., WO 03/092251, Jun. 11, 2003, WIPO, pp. 1, 13, 14, and 35.*
Office Action issued for corresponding Korean Patent Application No. 10-2005-0093190.
Chinese Office Action (with an English translation) issued in the corresponding foreign application No. 2005-10113591.4.
Japanese Office Action dated Jun. 3, 2008 issued in corresponding application No. JP 2004-299098.

* cited by examiner

*Primary Examiner*—Lester Kincaid
*Assistant Examiner*—Steven Lim
(74) *Attorney, Agent, or Firm*—Cohen Pontani Lieberman & Pavane LLP

(57) ABSTRACT

A personal digital assistant 1 composed of a main body 2 formed with an operation section 212; a cover body 3 which is freely attached and slides parallel to the operating section 212 from a position overlapped on the operation section side of the main body 2; and an energization spring 45 formed in the cover body 3 which applies force along a direction which maintains an opened state in an opened position where the cover body 3 has been made to slide from the main body 2. Accordingly, a sliding type personal digital assistant can be stabilized in a closed position and/or an opened position and prevent opening or closing in a midway through position.

3 Claims, 14 Drawing Sheets

PERSONAL DIGITAL ASSISTANT WITH SLIDE MECHANISM

CROSS-REFERENCE TO RELATED APPLICATION

This application is based upon and claims the benefit of priority from the prior Japanese Patent Application No. 2004-299098, filed Oct. 13, 2004, the entire contents of which is incorporated herein by reference.

BACKGROUND OF THE INVENTION

1. Field of the Invention

The present invention relates to a personal digital assistant, for example, a cellular phone, etc. with two housings (a main body and a cover body) formed with a practicable slide.

2. Description of the Related Art

As a conventional prior art cellular phone, there is what is called a foldable cellular phone in which a display section is formed in the cover body and a key input section formed in the main body. Both the cover body and the main body are attached so as to be foldable and overlapped with a hinge part. In addition, there is also a cellular phone which enables the cover body to slide on the main body. Guide grooves are formed in the lengthwise direction of the main body. Also, engagement tabs which freely engage during movement along the guide grooves are formed in the cover body. The cover body overlapped upon the main body and the guide grooves are made to engage with the engagement tabs. In such a cellular phone, the main body can be placed on a user's palm and the cover body slid against the main body by pressing the cover body with a person's thumb. In this manner, the operation section which is covered by the cover body can be exposed (for example, as disclosed in Japanese Laid-Open Patent Application No. 2003-110675 titled "MOBILE PHONE").

However, in the conventional prior art cellular phone having the above-mentioned sliding mechanism, because the slide stops midway through the closed position which overlaps the cover body upon the main body as well as the opened position in which the cover is made to slide completely away from the main body, there is the anxiety of not being able to switch functions. Thus, manipulation by the user to perform a sliding movement completely is complicated.

SUMMARY OF THE INVENTION

The present invention of a personal digital assistant with a slide mechanism has been made in view of the above-mentioned conventional problem. Accordingly, the object of the present invention is to provide a personal digital assistant which can be stabilized in a closed position and/or an opened position and prevent opening or closing in a midway through position.

In order to solve the above-mentioned problem, the present invention of a personal digital assistant (cellular phone 1) comprises a main body 2 formed with an operation section (ten-key pad 212); a cover body 3 which is freely attached and slides parallel to the operating section from a position overlapped on the operation section side of the main body 2; and an energization spring (torsion springs 45) formed in the cover body 3 which applies force to the direction which maintains an opened state in an opened position to which the cover body 3 has been made to slide from the main body 2.

According to the present invention, a sliding type personal digital assistant can be stabilized in a closed position and/or an opened position and prevent opening or closing in a midway through position.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, the preferred embodiments of the present invention will be described in detail with reference to the drawings.

Figure 1A:
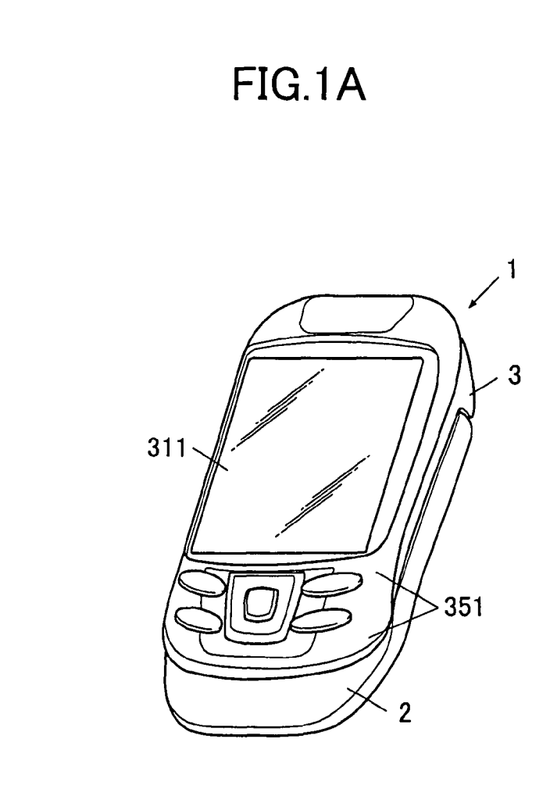
FIGS. 1A~1C are perspective diagrams showing a cellular phone as an embodiment of the present invention.
Figure 1B:
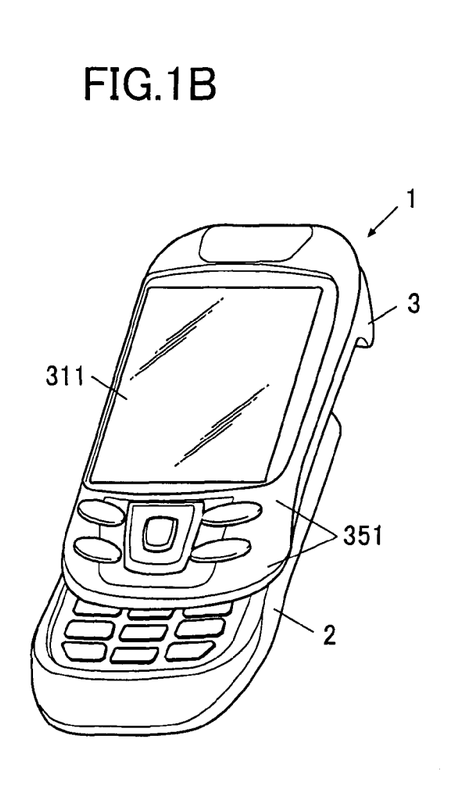
Figure 1C:
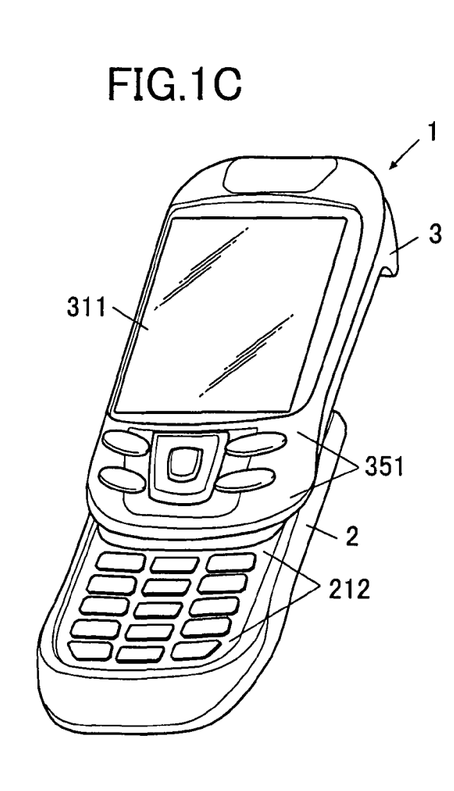

FIGS. 1A~1C are perspective diagrams showing a cellular phone as an embodiment of the present invention.

A cellular phone 1 comprises a main body 2 with a ten-key pad 212 formed in the upper surface and a cover body 3 with an LCD window 311 and cursor keys 351 formed in the upper surface. The main body 2 and the cover body 3 are attached so that the cover body 3 can be moved in backward and forward directions to the main body 2 with a slide unit 4 described later. Accordingly, the cellular phone 1 can be arranged in a state (closed position) with the cover body 3 overlapped upon the main body 2 concealing the ten-key pad 212 as seen in FIG. 1A or in a state (opened position) with the cover body 3 moved in a forward direction to the main body 2 revealing the ten-key pad 212 as seen in FIG. 1C. Also, FIG. 1B shows an intermediate position of FIGS. 1A and 1C.

Figure 2:
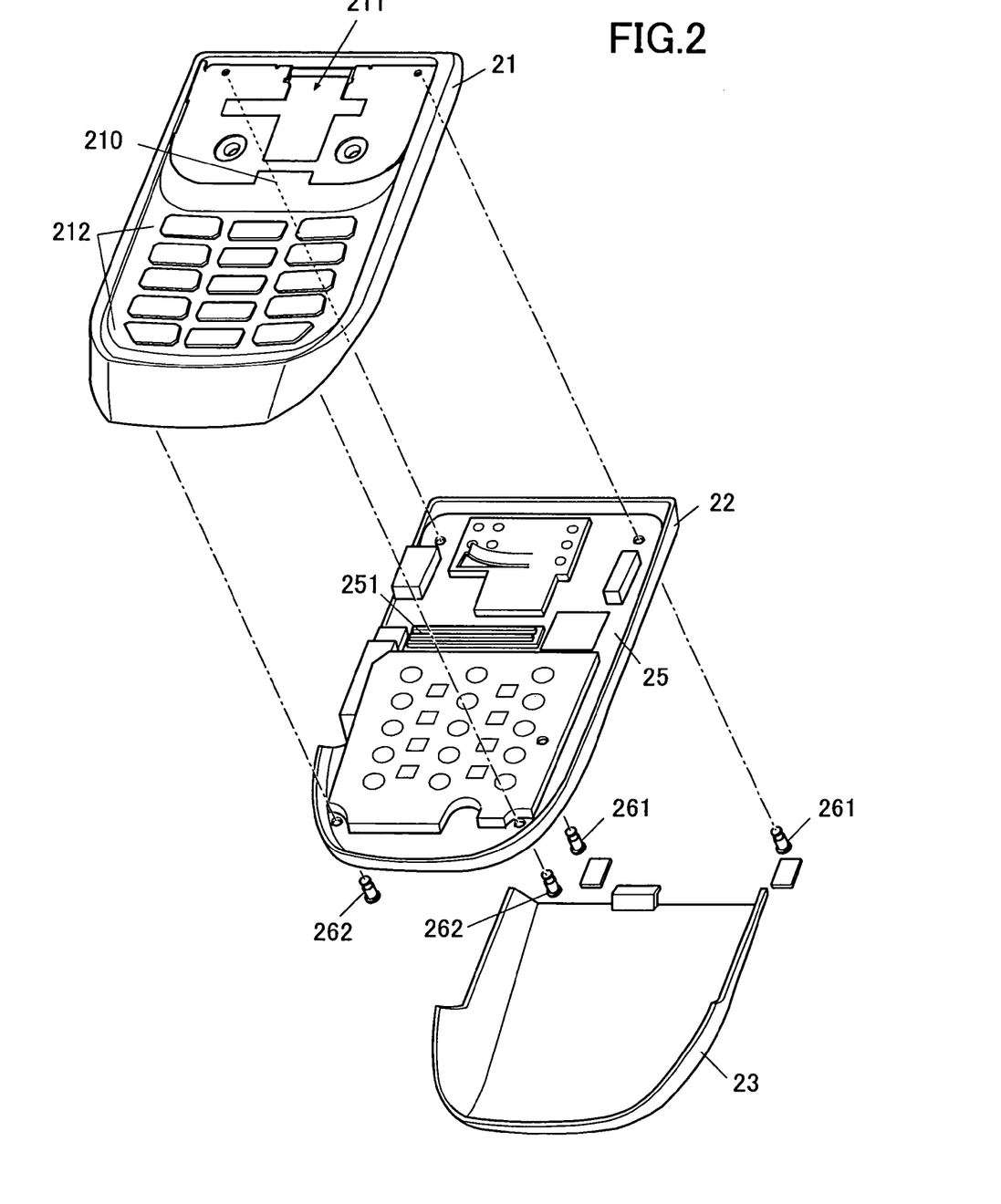
FIG. 2 is an exploded perspective view diagram showing the main body for the cellular phone of FIG. 1.

FIG. 2 is an exploded perspective view diagram showing the main body 2.

Figure 3:
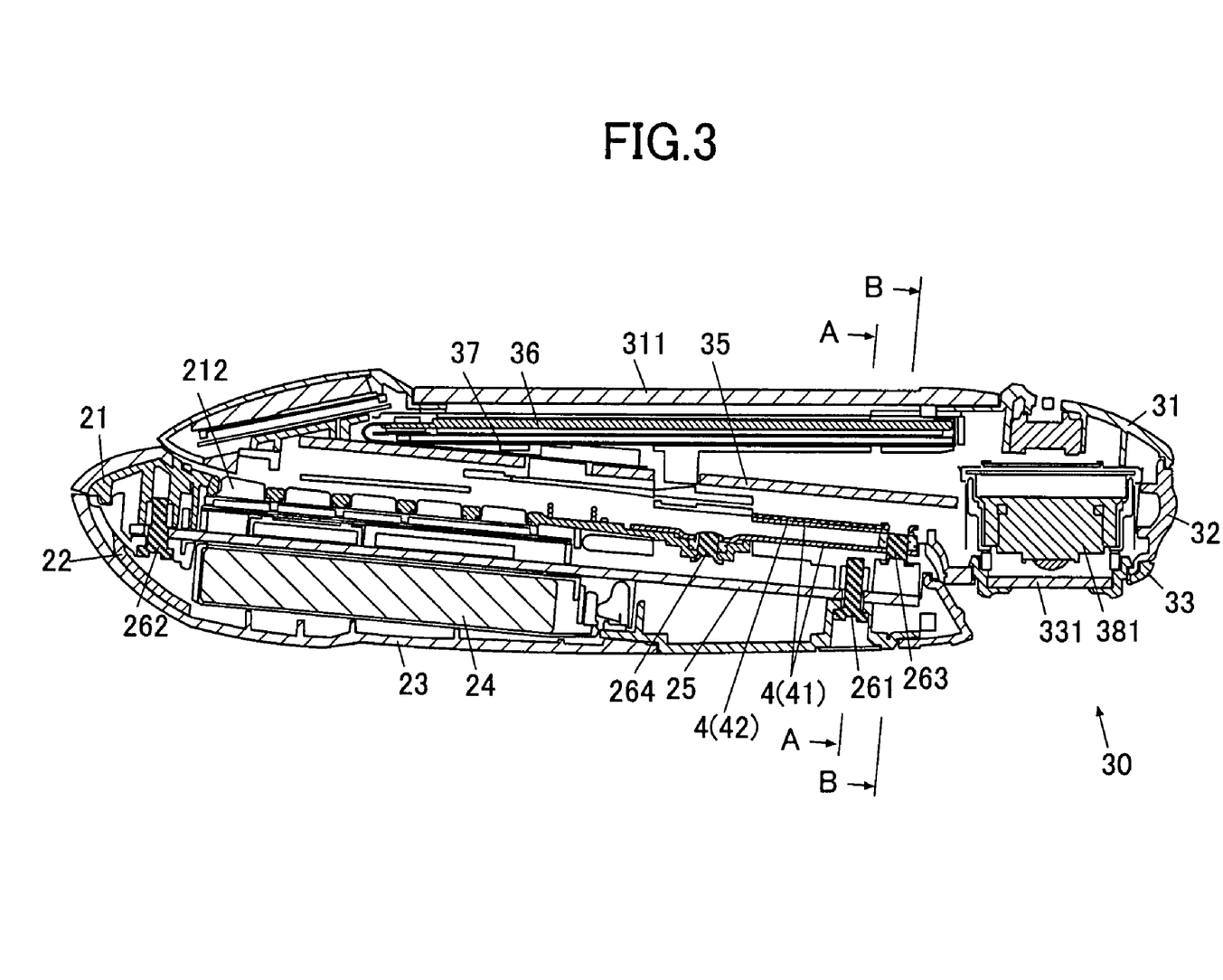
FIG. 3 is a sectional side view diagram showing the cellular phone of FIG. 1.

The external shape of the main body 2 is formed by a front case 21, a rear case 22 and a battery cover 23 and, as shown in FIG. 3, a battery 24, a main substrate 25, etc. are encased in that inner portion.

Figure 4:
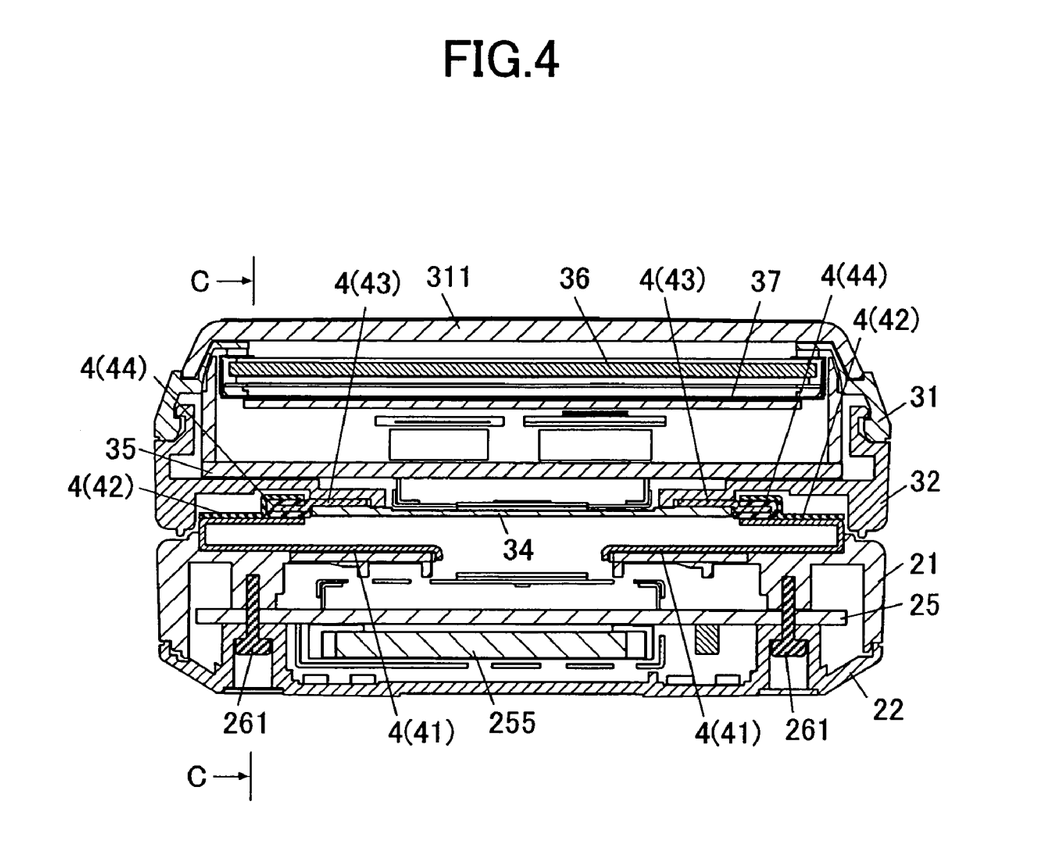
FIG. 4 is an A-A cross-sectional view diagram of FIG. 3.
Figure 5:
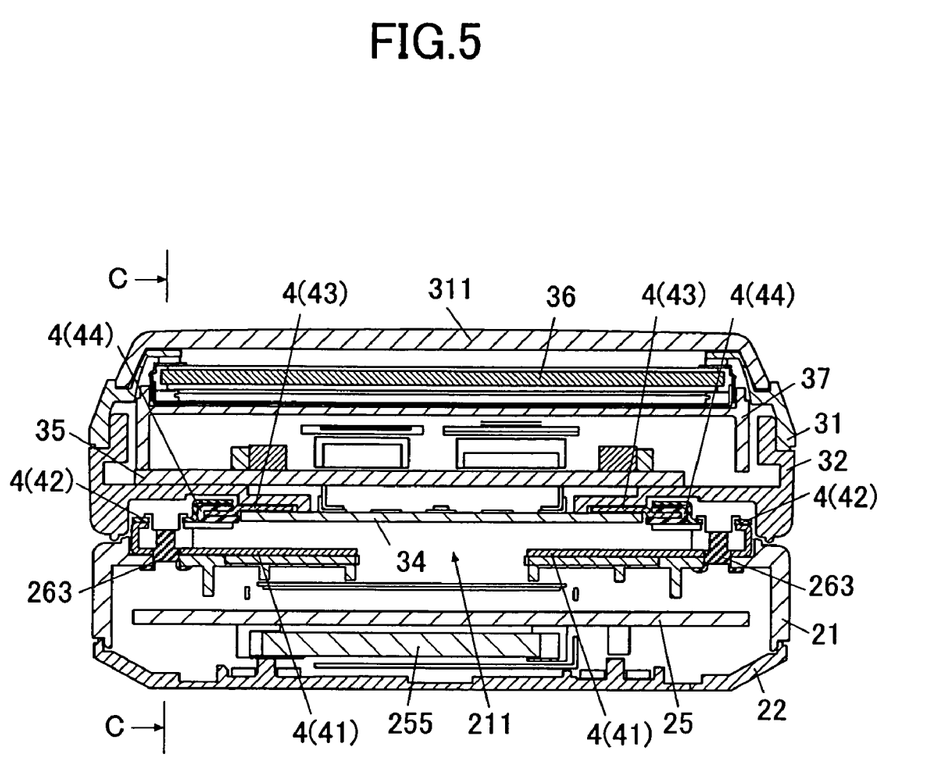
FIG. 5 is a B-B cross-sectional view diagram of FIG. 3.

FIG. 3 is a sectional side view diagram showing the cellular phone 1. FIG. 4 is an A-A cross-sectional view diagram of FIG. 3. FIG. 5 is a B-B cross-sectional view diagram of FIG. 3.

In addition, FIG. 3 corresponds to a C-C cross-section of FIG. 4 and FIG. 5. The front portion and rear portion of the front case 21 and the rear case 22 are joined using screws 261 and 262 with a main substrate 25 situated in between as shown in FIG. 4.

An FPC connector 251 (refer to FIG. 2) is formed in the main substrate 25 and connected with a main substrate side connector 51 (refer to FIG. 9) for an FPC substrate 5 (flexible printed circuit substrate) described later. In addition to this, a vibrator motor 252, a main processor, a sensor for the ten-key pad 212, a main antenna, a sub-antenna, a memory card slot 255, a modem, a memory, a power source IC, an IF connector, an earphone connector, etc. are provided.

Figure 9:
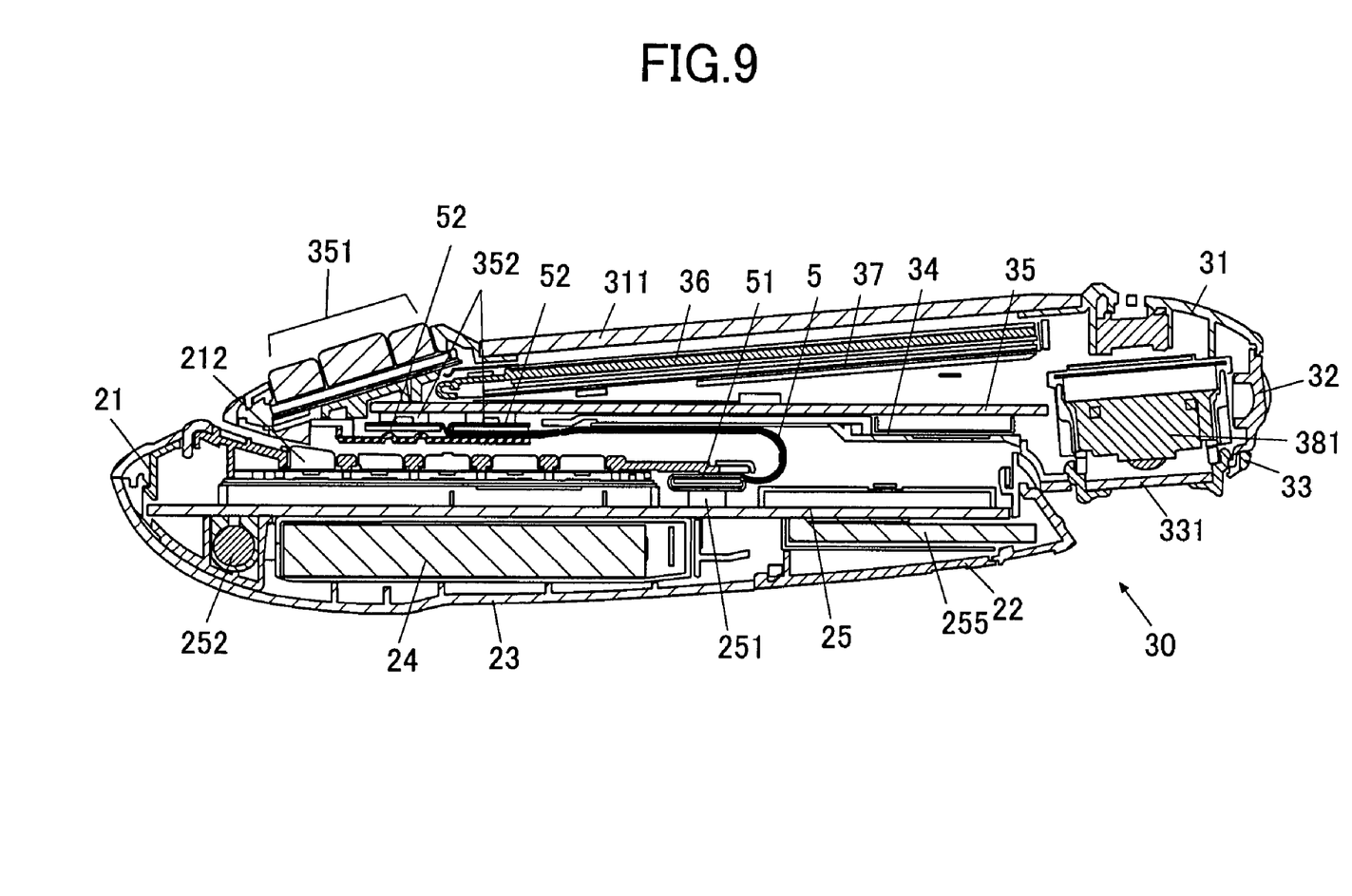
FIG. 9 is a cross-sectional view diagram showing the cellular phone of FIG. 1.
Figure 10:
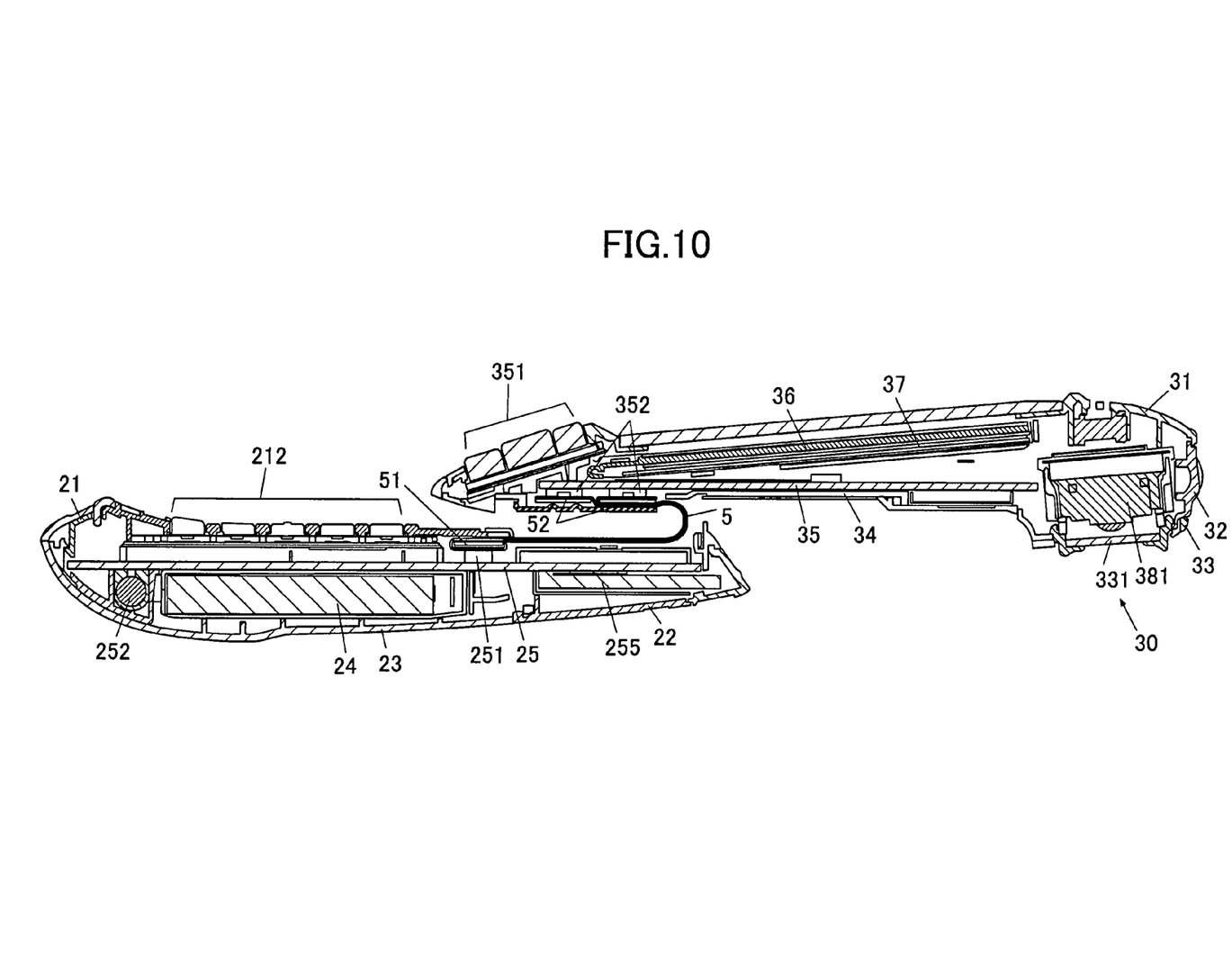
FIG. 10 is a cross-sectional view diagram for the cellular phone of FIG. 1.

The front case 21 is provided with the ten-key pad 212 and an FPC insertion opening 211 for passing through of the FPC substrate 5 described later. On the upper surface of the front case 21, as seen in FIG. 3 and FIG. 5, a base 41 for the slide unit 4 and guide rails 42 for the slide unit 4 are mounted with screw fasteners using screws 263, 264 described later. Also, a latching part 210 is provided in the rear portion of the FPC insertion opening 211 of the front case 21. The rear end portion of the base 41, as shown in FIG. 9 and FIG. 10 is fastened and situated between the front case 21 main body adjacent to the latching part 210.

Figure 6:
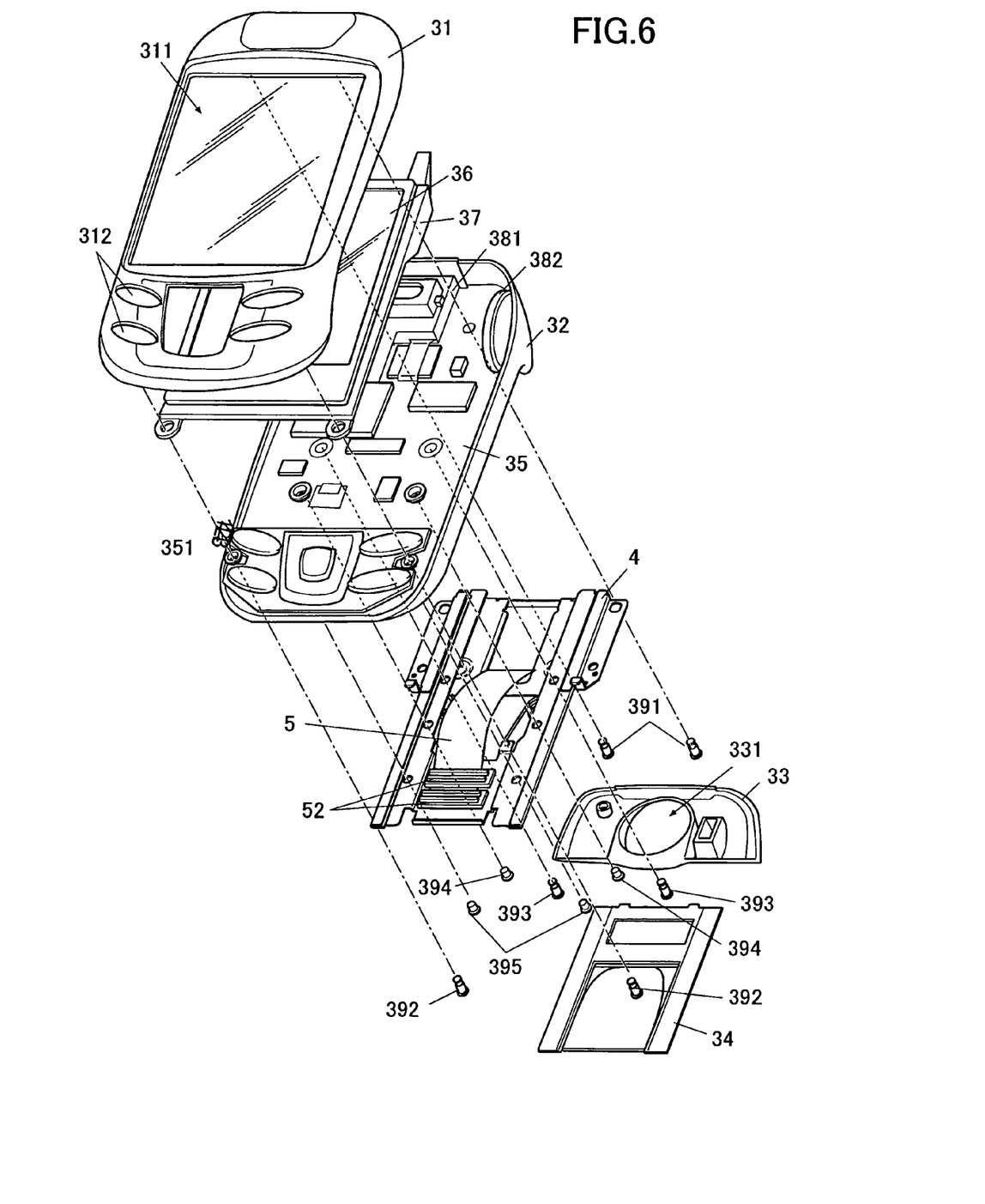
FIG. 6 is an exploded perspective view diagram showing the cover body for the cellular phone of FIG. 1.

FIG. 6 is an exploded perspective view diagram showing the cover body 3. The cover body 3 external shape is formed with a front case 31, a rear case 32, a camera cover 33 and a rail cover 34. Also, encased in that inner portion is a sub-substrate 35, an LCD 36 (liquid crystal display), a camera unit 381, a stereo speaker 382, etc.

The front case 31 is provided with an LCD window 311 and cursor key openings 312. The LCD window 311 is transparent which permeates the display shown to the user by the LCD 36 as well as protects the LCD 36 built in the cover body 3. The cursor key openings 312 expose the cursor keys 351 formed in the sub-substrate 35 which make keystroke operations possible by the user.

Figure 11:
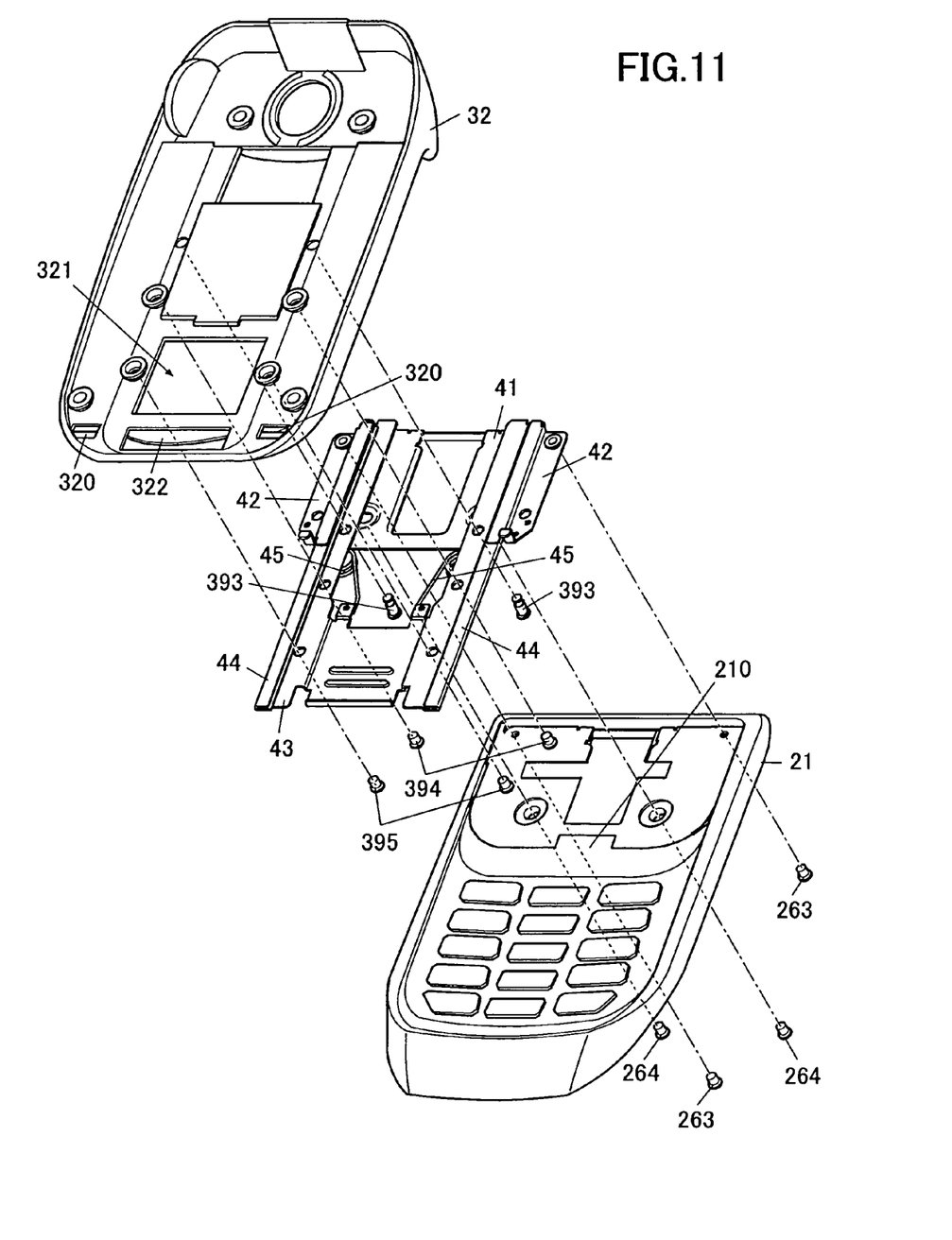
FIG. 11 is an exploded perspective view diagram showing the mounting structure of the main body and cover body for the cellular phone.

The rear case 32, as seen in FIG. 11, is provided with a connector through hole 321 for passing through a sub-substrate 35 side connector for the FPC substrate 5 described later.

Figure 7:
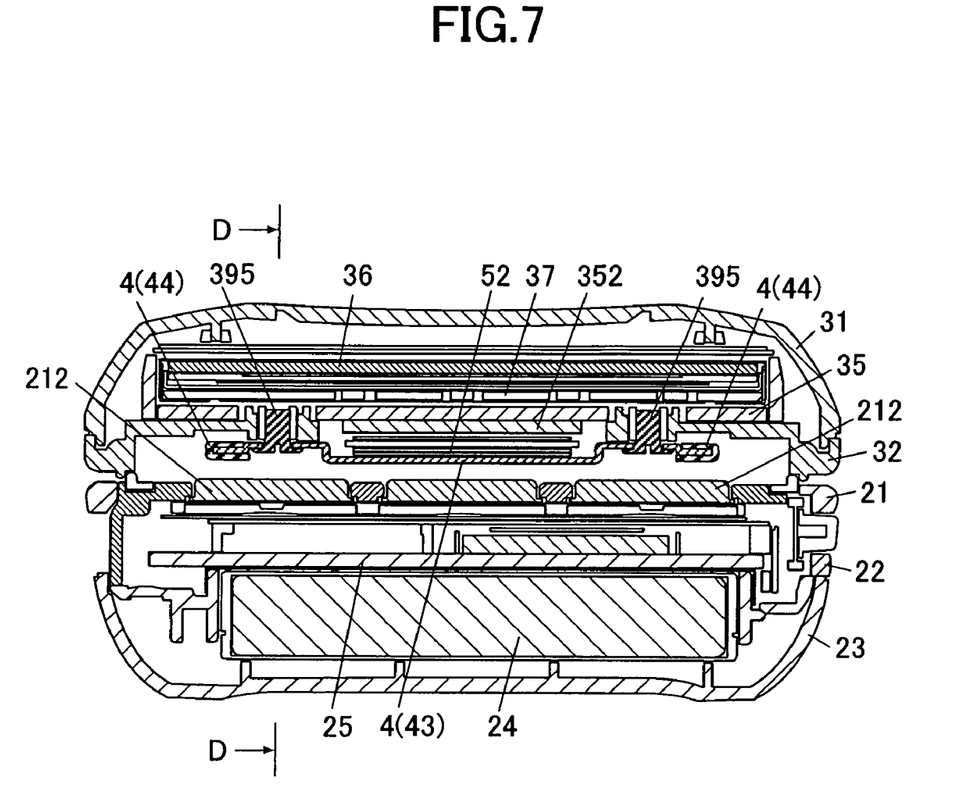
FIG. 7 is a back portion traverse sectional view diagram showing the cellular phone of FIG. 1.
Figure 8:
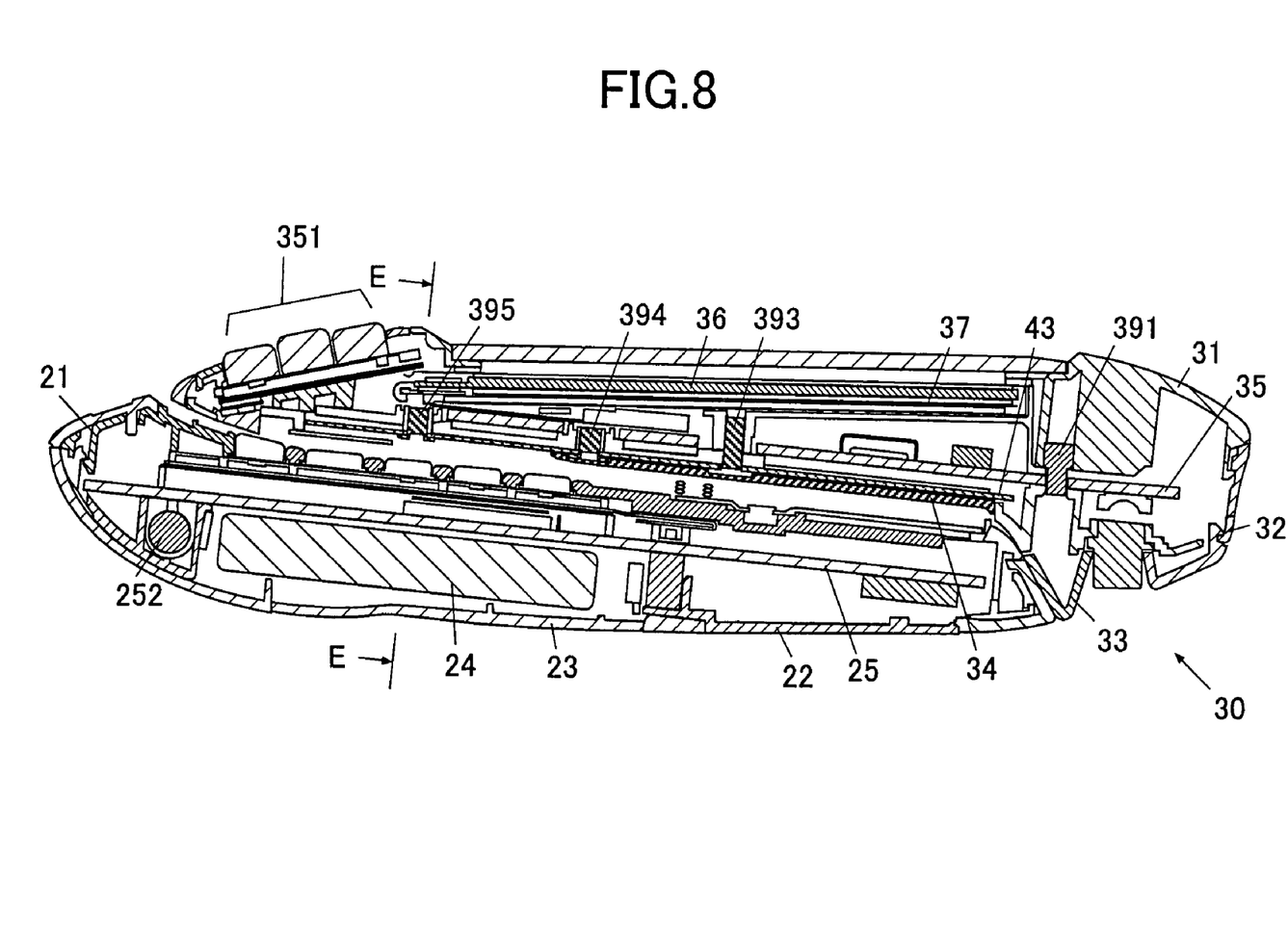
FIG. 8 is a D-D cross-sectional view diagram of FIG. 7.

FIG. 7 is a sectional view diagram showing the cellular phone 1. FIG. 8 is a D-D cross-sectional view diagram of FIG. 7. In addition, FIG. 7 corresponds to an E-E cross-section of FIG. 8. The front portion of the front case 31 and the rear case 32, as shown in FIG. 6 and FIG. 8, are joined by screws 391 with the sub-substrate 35 situated in between. Also, the rear portion of the front case 31 and the rear case 32 are joined by screws 392 with a frame 37 situated in between.

In the lower surface of the rear case 32, as seen in FIGS. 7 and 8, a rail 43 of the slide unit 4 is mounted with screw fasteners using screws 393, 394 and 395 described later. Also, the backside portion of the rail 43 mounted in the rear case 32 is formed with engagement holes 320 (refer to FIG. 14) where engagement tabs 416, 424 described later project backward.

The camera cover 33 is mounted on the front side of the rear case 32 and insulates the camera unit 381 and the stereo speaker 382 as shown in FIG. 6. The portion where the camera cover 33 of the cover body 3 is mounted constitutes the thickest portion 30 which has a more increased thickness than the other portions. Also, in the camera cover 33, as shown in FIGS. 6, 9 and 10, a camera window 331 is provided which permits permeation of the light for an imaged object to reach the camera unit 381.

The rail cover 34 is mounted on the rear case 32 and, when the cellular phone 1 is in an opened position, the portion exposed to the front part of the main body 2 for the rail 43 is covered.

The sub-substrate 35 is provided with a sub-processor, a camera power source IC, the cursor keys 351, etc. The cursor keys 351 are exposed outward from the cursor key openings 312 which make keystroke operations possible by the user. Also, in the back surface of sub-substrate 35, an FPC substrate connector 352 is connected to a sub-substrate side connector 52 for the FPC substrate 5 described later.

The LCD 36 is supported by the frame 37. The frame 37 is fixed to the rear case 32. The camera unit 381 and the stereo speaker 382 are encased in the front portion of the front case 31 and the rear case 32 as shown in FIG. 6.

FIG. 9 is a cross-sectional view diagram observed from the side of the cellular phone 1 of FIG. 1A. FIG. 10 is a cross-sectional view diagram observed from the side of the cellular phone 1 of FIG. 1C. As seen in FIGS. 9 and 10, the main body 3 constitutes a shape which is thinner toward the front.

The cover body 3 constitutes a shape which is thicker toward the front. Also, the front end part of the cover body 3 is the thickest portion 30 which has a more increased thickness. Within this thickness of the device, the camera unit 381, the stereo speaker 382, etc. are encased.

The thickest portion 30, as shown in FIG. 9, is situated ahead of the main body 2 even in a closed position and does not overlap over the main body 2. Accordingly, even if a thick device is encased in the front end part, the thickness of the cellular phone 1 in a closed position does not increase.

As shown in FIG. 9, in a closed position, both of the rear end surfaces of the main body 2 and the cover 3 are constructed with upward inclined surfaces toward the front. The cross-sectional shape of the rear end portion of the cover body 3 has an acute angle. Also, the cursor keys 351 of the cover body 3 are provided on an inclined surface of the rear end portion.

Accordingly, as shown in FIG. 10 in an opened position, when the rear end portion of the cover body 3 is advanced to the front portion of the ten-key pad 212 and the ten-key pad 212 is exposed, the rear end portion of the cover body 3 is situated at a cross-sectional acute angle ahead of the ten-key pad 212. Since the upper surface of the main body 2 provides the ten-key pad 212 and the inclined surface of the rear end portion of the cover body 3 provides the cursor keys 351 consecutively, finger movement is simplified when manipulating the ten-key pad 212 and the cursor keys 351.

Additionally, as seen in FIG. 10 in an opened position, since the thin front end portion of the main body 2 and the thin rear end portion of the cover body 3 overlap, the thickness of the cellular phone 1 in an opened position almost becomes the unified. Accordingly, there is no problem with the thickness doubling at the center portion crossing direction (back and forth directions) such as a conventional sliding type cellular phone and thus is user-friendly.

The FPC substrate 5 comprises a main substrate side connector 51 and a sub-substrate side connector 52 on both ends which are connected to the main substrate 25 and the sub-substrate 35 described later. In a closed position, as shown in FIG. 9, the main substrate side connector 51 is situated forward and the sub-substrate side connector 52 is situated backward. From the closed position, when the cover body 3 is moved frontward, the sub-substrate side connector 52 will move forward. Thus, as shown in FIG. 10 in the opened position, the sub-substrate side connector 52 will be situated forward more than the main substrate side connector 51.

Next, the slide unit 4 which is mounted to the main body 2 and the cover body 3 so that the cover body 3 can be moved in backward and forward directions to the main body 2 will be explained.

Figure 12:
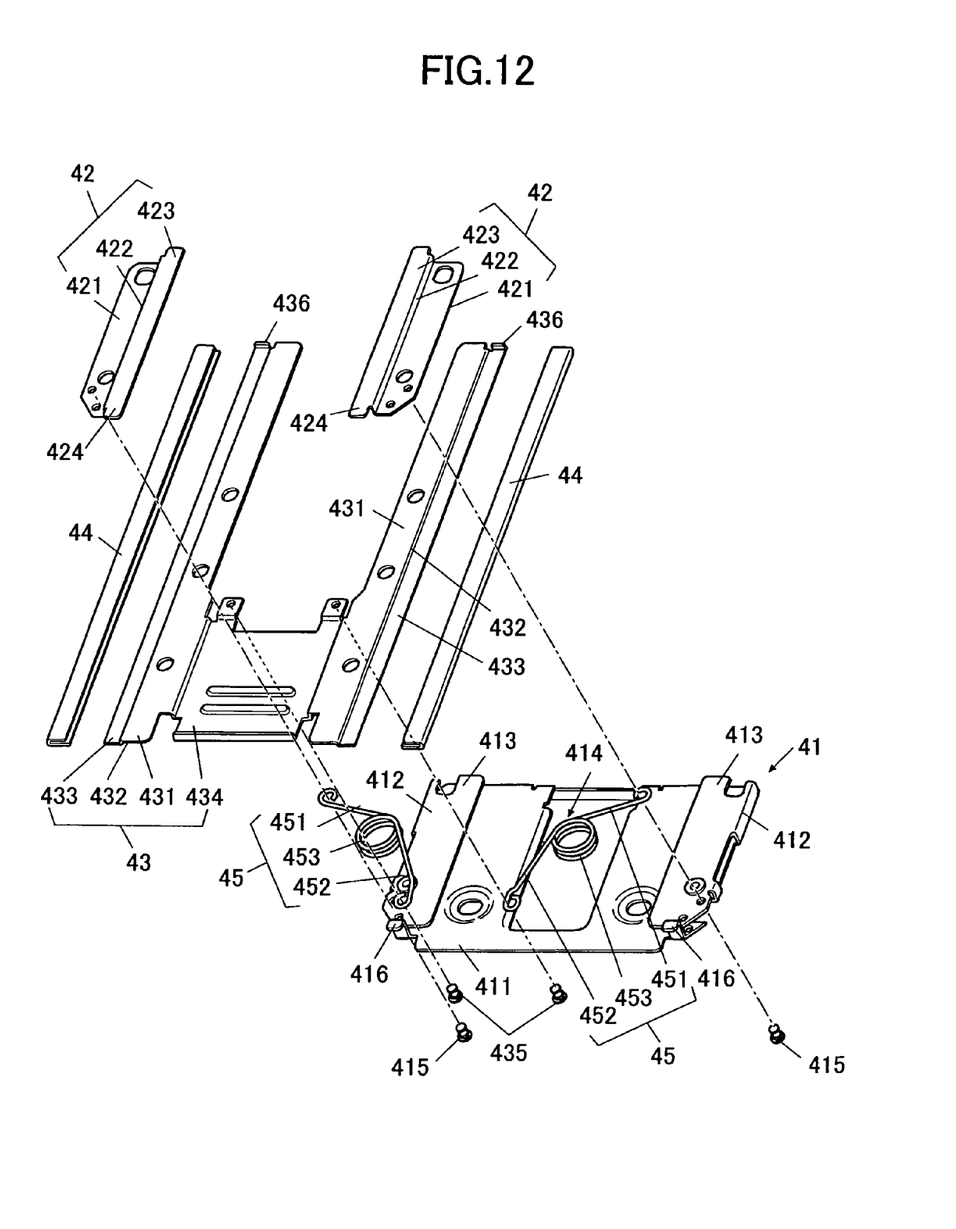
FIG. 12 is an exploded perspective view diagram showing the slide unit for attaching the main body and the cover body of FIG. 11.

FIG. 11 is an exploded perspective view diagram showing the mounting structure of the slide unit 4 which attaches between the main body 2 and the cover body 3. As seen in FIG. 12, the outline configuration of the slide unit 4 is constituted by the base 41, a pair of the guide rails 42, the rail 43, a pair of spacers 44 and a pair of torsion springs 45.

The base 41 and the guide rails 42 are mounted on the front case 21 of the main body 2 with screws 263, 264. Also, the rail 43 is mounted on the rear case 32 of the cover body 3 with the screws 393, 394 and 395.

FIG. 12 is an exploded perspective view diagram of the slide unit 4. The base 41 is composed of a base 411, attachment parts 412 and guide rail stationary parts 413. The base 411 and the guide rail stationary parts 413, as shown in FIG. 11, are fixed to the front side part of the front case 21 for the main body 2.

The attachment parts 412 are formed on the protruding left and right side edges of the base 411 in the cover body 3 side. Also, an FPC insertion opening 414 is provided for pass through of the FPC substrate 5 in the base 411.

The attachment parts 412 are spaced up and down and adjoin the base 411 and the guide rail stationary parts 413. The guide rail stationary parts 413 are joined to the left and right of the attachment parts 412, respectively. The guide rails 42 are fastened to the guide rail stationary parts 413.

In between the base 411 and each of the guide rail stationary parts 413 for the rear part of the base 41, the end parts of the base side arms 451 of the torsion springs 45 are mounted to be freely rotatable on the base side support shafts 415, respectively. Also, the space between the base 411 and the guide rail stationary parts 413 constitutes the track for movement of the torsion springs 45.

Each of the guide rails 42 is composed of a base part 421, an attachment part 422 and a spacer maintenance part 423. The base parts 421 are fixed to the guide rail stationary parts 413 of the base 41. The attachment parts 422 separate the spacer maintenance parts 423 from the guide rail stationary parts 413 and are connected to the base parts 421. Both of the spacer maintenance parts 423 maintain free sliding on the rail 43 via the pair of spacers 44 arranged in between the guide rail stationary parts 413, respectively.

Figure 14:
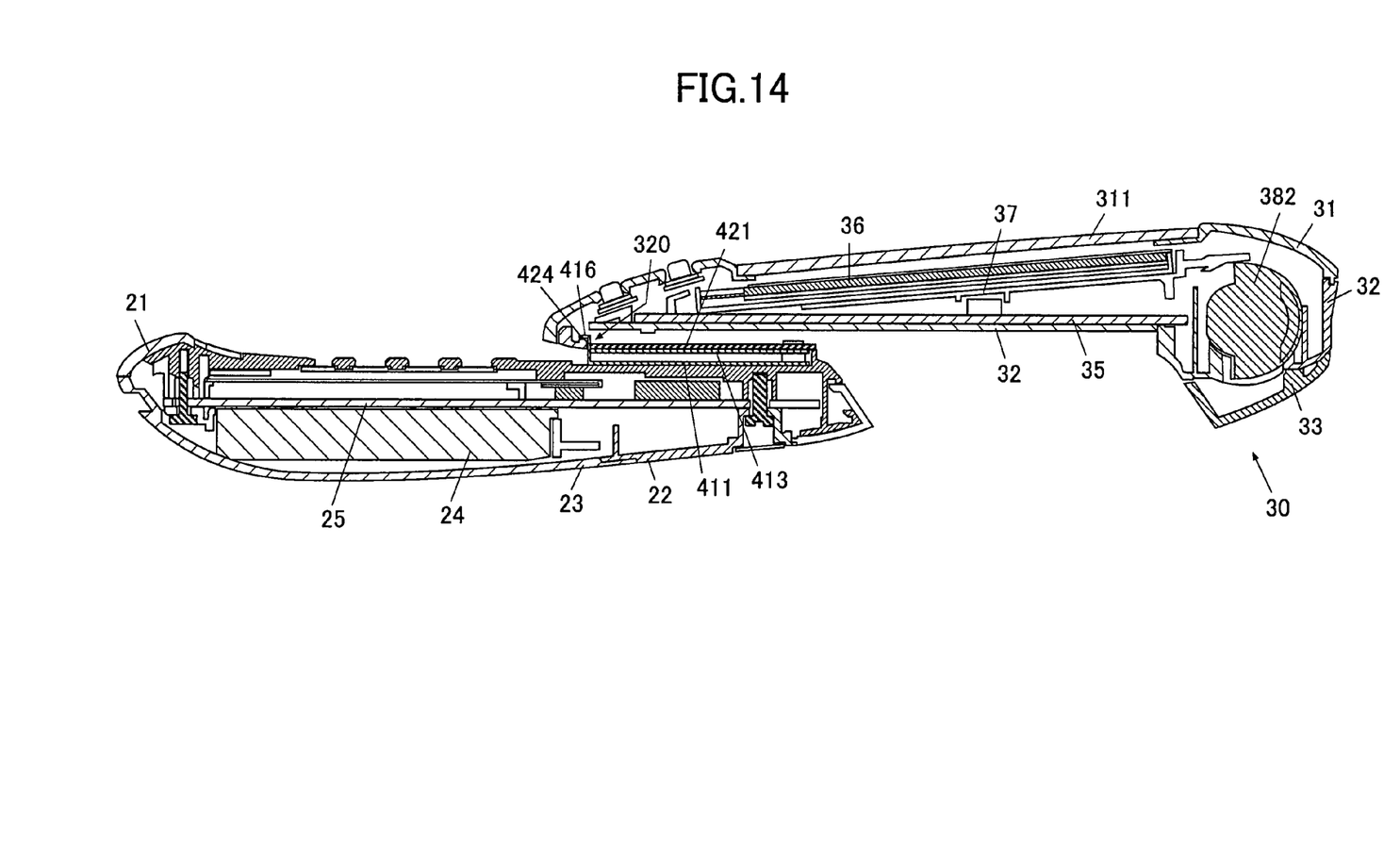
FIG. 14 is a sectional side view diagram showing the cellular phone of FIG. 1.

Also, in the rear end portion of the base 41 and each of the guide rails 42, the engagement tabs 416, 424 are provided which project backward, respectively. As seen in FIG. 14, the engagement tabs 416, 424 engage with the engagement holes 320 formed in the rear case 32 and stop the cover body 3 which slides forward to the main body 2. Even in the case where downward force is applied to the front side part of the cover body 3 in an opened position, the engagement tabs 416, 424 are engaged with the engagement holes 320 (refer to FIG. 11). This prevents uplift of the cover body 3 back end from the main body 2, thus the rigidity of the cellular phone 1 in an opened position can be enhanced.

The rail 43 is composed of stationary parts 431, attachment parts 432, spacer stationary parts 433 and a coupling part 434.

A left and right pair of the stationary parts 431 are mounted in the rear case 32 in a parallel back and forth direction.

The attachment parts 432 separate the spacer stationary parts 433 from the rear case 32 and connect with the stationary parts 431. The spacer stationary parts 433 secure the left and right pair of spacers 44 in a parallel back and forth direction. Also, the protruding parts 436 which project upward are formed on the front end of the spacer stationary parts 433. The protruding parts 436 contact with the front end of the guide rails 42, respectively, and stop the rail 43 which slides backward to the guide rails 42 and the base 41.

The coupling part 434 connects the left and right pair of stationary parts 431. The sub-substrate side connector 52 for the FPC substrate 5 is arranged on the upper surface of the coupling part 434. On the lower surface of the front end left and right sides of the coupling part 434, the end parts of the rail side arms 452 of the torsion springs 45 are mounted to be freely rotatable on the rail side support shafts 435, respectively. The FPC substrate 5 pass through is situated between the section of the mounted left and right rail side support shafts 435.

The spacers 44 are a cross-section "]" type shape and cover the spacer stationary parts 433 of the rail 43, respectively, and enable sliding of the base 41 and the guide rails 42 on the rail 43. As for the material for the spacers 44, it is preferable to use material with a low friction coefficient for the base 41 and the guide rails 42.

The torsion springs 45 are composed of a coiled portions 453 which join the base side arms 451 and the rail side arms 452, as well as the base side arms 451 and the rail side arms 452, respectively. The coiled portion 453 applies force so that the base side arms 451 and the rail side arms 452 can be expanded. The end part of the base side arms 451 are mounted to be freely rotatable on the base side support shafts 415 as well as the end part of the rail side arms 452 on the rail side support shafts 435, respectively. Since the torsion springs 45 apply force so that the spacing of the end part of the base side arms 451 and the end part of the rail side arms 452 can be expanded, the accompanying force shifts in a direction so that the base side support shafts 415 and the rail side support shafts 435 become further apart, respectively.

Figure 13A:
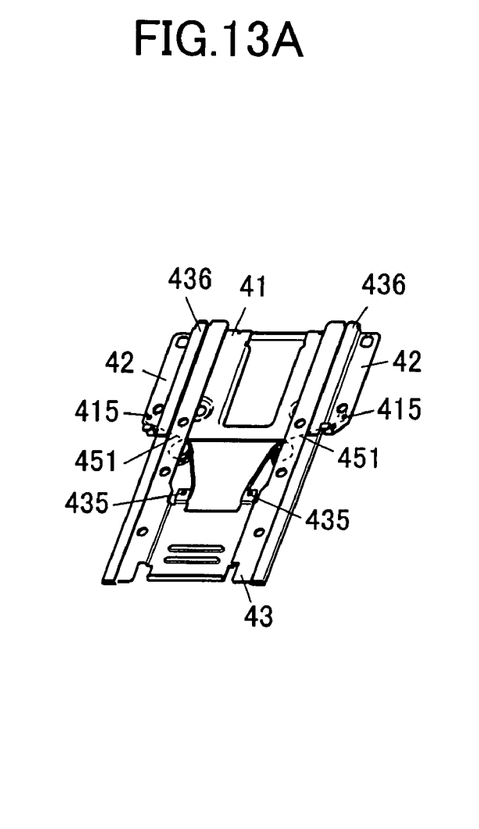
FIGS. 13A~13C are perspective diagrams showing the form of the slide unit corresponding to the form of the cellular phone of FIGS. 1A~1C, respectively.
Figure 13B:
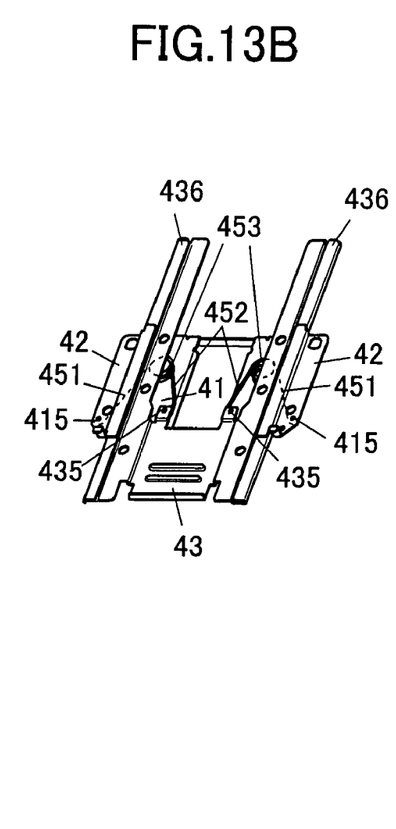
Figure 13C:
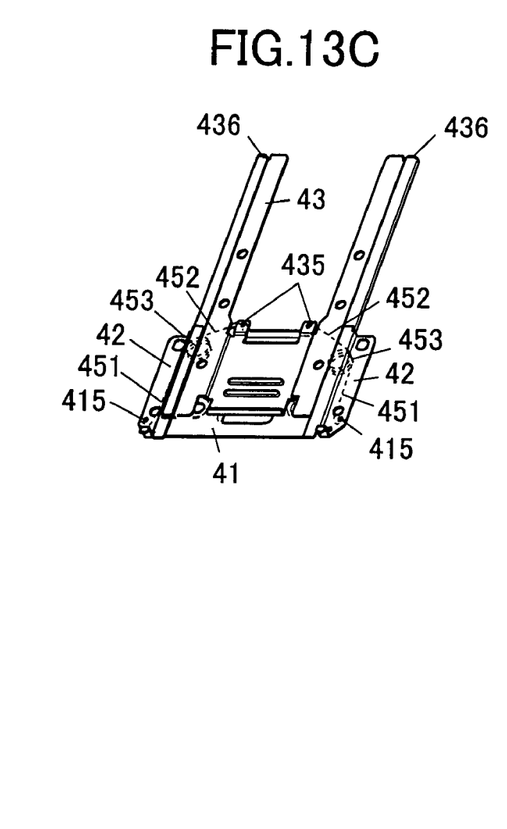

FIGS. 13A~13C are perspective diagrams showing the form of the slide unit corresponding to the form of the cellular phone 1 of FIGS. 1A~1C, respectively. FIG. 13A shows the closed position with the cover body 3 overlapped upon the main body 2. The protruding parts 436 of the rail 43 front end are in contact with the front end of the guide rails 42. At this stage, since the rail side support shafts 435 are situated backward more than the base side support shafts 415, the elastic force of the torsion springs 45 is applied forcibly in a direction where the rail side support shafts 435 are further apart from the base side support shafts 415, namely, backward.

When the main body 2 of the cellular phone 1 in a closed position is placed in a user's palm and the cover body 3 is pressed forward with a person's thumb, the elastic force of the torsion springs 45 will be countered and the cover body 3 advances forward to an intermediate position as seen in FIG. 13B. At this stage, since the rail side support shafts 435 and the base side support shafts 415 are located in a line on the left and right, the elastic force of the torsion springs 45 functions in the direction where the rail side support shafts 435 recede to the base side support shafts 415, namely, an upright left and right direction to the rail 43. Accordingly, the intermediate position is an unstable position in which the torsion springs 45 apply force in neither a backward nor a forward direction.

When the cover body 3 is pressed forward with a person's thumb further from the intermediate position, since the rail side support shafts 435 are situated forward more than the base side support shafts 415, the torsion springs 45 apply force in the direction where the rail side support shafts 435 are further apart from the base side support shafts 415, namely, forward. Accordingly, when the cover body 3 is pressed forward more than the intermediate position and afterward even if the cover body 3 is not pressed, the cover body 3 moves ahead according to the elastic force of the torsion springs 45.

In the cover body 3, as seen in FIG. 14, the engagement tabs 416, 424 formed in the rear end portion of the base 41 and the guide rails 42 engage with the engagement holes 320 formed in the rear case 32. This stops the forward movement of the cover body 3 and the cellular phone 1 will be in the opened position. In cases where downward force is applied to the front portion of the cover body 3 in the opened position, the back end of the cover body 3 will attempt to uplift from the main body 2. However, since the engagement tabs 416, 424 are engaged with the engagement holes 320, the uplift of the cover body 3 from the base 41 and the guide rails 42 is prevented. Additionally, since the back end of the base interlocks with the latching part 210 of the front case 21 for the main body 2, this prevents the base 41 from uplifting along with the cover body 3 and the rigidity of the cellular phone 1 in an opened position can be enhanced.

Similarly, in cases where the cover body 3 is moved backward from an opened position to the intermediate position, although there is the necessary opposing force action of the elastic force in the torsion springs 45, after the intermediate position the cover body 3 moves backward according to the elastic force of the torsion springs 45.

In addition, the movable radius of the coiled portions 453 centered on the base side support shafts 415, namely, the added length of the base side arms 451 and the radius of the coiled portions 453 is shorter than the shortest separation (distance) of the rail side support shafts 435 and the base side support shafts 415, respectively. Accordingly, the coiled portions 453 of the torsion springs 45 travel in a lateral track more than the rail side support shafts 435. Although the track is constituted where the FPC substrate 5 travels between the rail side support shafts 435, since the track of the torsion springs 45 is more lateral than the FPC substrate 5 track, the torsion springs 45 to do not impede movement of the FPC substrate 5.

Similarly, the movable radius of the coiled portions 453 centered on the rail side support shafts 435, namely, the added length of the rail side arms 452 and the radius of the coiled portions 453 is shorter than the shortest separation (distance) of the rail side support shafts 435 and the base side support shafts 415, respectively. Accordingly, the coiled portions 453 of the torsion springs 45 travel on a more inner side track than the track of the base side support shafts 415.

As explained above in the preferred embodiment, the present invention can be multi-functionalized without increasing the thickness of the cellular phone 1, because the thickest part which increases thickness in the main body 2 is formed in the front end portion of the cover body 3 and because a device having the thickness of the camera device 381, the stereo speaker 382, etc. can be encased in the thickest part.

Additionally, since the thin front portion of the main body 2 and the thin rear portion of the cover body 3 overlap when moving the cover body 3 forward to the main body 2, the thickness of the cellular phone 1 becomes unified in a back to front direction, which markedly enhances user-friendliness.

Besides, although a sliding type cellular phone has been explained in the above-mentioned preferred embodiment, the present invention is not limited to this. For example, the present invention may be applied to other types of personal digital assistants, etc. Also, although the shape of the above-mentioned torsion springs 45 each contain one of the coiled portions 453, these springs may use two coiled portions. Naturally, other constructional details may be suitably changed as well.

While the present invention has been described with reference to the preferred embodiments, it is intended that the invention be not limited by any of the details of the description therein but includes all the embodiments which fall within the scope of the appended claims.

What is claimed is:

1. A personal digital assistant apparatus including a first housing formed with an operation section and a second housing which is freely attached and slides parallel to the operation section from a position overlapped on the operation section side of the first housing, comprising:

a slide unit having a base, a pair of guide rails connected to the base, and a rail assembly slideably connected to the pair of guide rails, wherein the base and the pair of guide rails are attached to the first housing and the rail assembly is attached to the second housing, wherein the base comprises a base section, a pair of guide rail stationary sections connected to the pair of guide rails, and a pair of guide rail sections connecting the base section and the pair of guide rail stationary sections, said pair of guide rail stationary sections forming spaced apart spaces between the base section and the pair of guide rail stationary sections, respectively;

an energization spring in the first housing and the second housing attachment portion which applies force to the second housing along a direction which maintains a closed state in a closed position overlapping the first housing and the second housing and applies force to the second housing along a direction which maintains an opened state in an opened position when the second housing has been slid from the first housing;

the first housing and the second housing are connected by a flexible printed circuit substrate formed in a central area of the terminal apparatus, wherein the flexible printed circuit substrate provides interconnectivity of a plurality of functions of the personal digital assistant apparatus; and the energization spring comprises two energization springs spaced from each other and disposed along a respective lateral track about the flexible printed circuit substrate, wherein each energization spring expands along its respective lateral track and within the spaced apart spaces.

2. The personal digital assistant apparatus according to claim 1, wherein both ends of the energization spring are fastened to the first housing and the second housing, respectively;

wherein position for a sliding direction of a first housing side stationary part resides between positions in a closed state and in an open state of a second housing side stationary part; and the energization spring applies force so that the first housing side stationary part and the second housing side stationary part are reciprocally spaced.

3. The personal digital assistant apparatus according to claim 1, wherein the energization springs are attached to a first housing side arm and a second housing side arm;

the first housing side arm is fastened freely rotatable to the first housing at an end; the second housing side arm is fastened freely rotatable to the second housing at an end;

and a coiled portion applies force in a direction which opens the first housing side arm and the second housing side arm;

the second housing side stationary part is spaced and formed in an upright direction to a slide direction situated along the respective lateral trackabout the flexible printed circuit substrate; and the first housing side stationary part is spaced and formed further in an upright direction to the slide direction greater than the added length of the radius of the coiled portions and length of the first housing side arm which is more than the second housing side stationary part.

* * * * *